(12) United States Patent
Christianson

(10) Patent No.: US 6,707,415 B1
(45) Date of Patent: Mar. 16, 2004

(54) METHOD AND SYSTEM FOR GENERATING WEATHER AND GROUND REFLECTIVITY INFORMATION

(75) Inventor: Paul E. Christianson, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/325,563

(22) Filed: Dec. 20, 2002

(51) Int. Cl.⁷ .......................... G01S 13/95; G01S 13/89
(52) U.S. Cl. .......................... 342/26; 342/25; 342/159; 342/175; 342/176; 342/179; 342/190; 342/191; 342/195
(58) Field of Search .......... 342/25–28, 89–103, 342/159–165, 175, 188, 189–197, 176–186, 64; 702/155–172; 345/418–427; 250/216, 234; 700/28–55

(56) References Cited

U.S. PATENT DOCUMENTS

| | | | | |
|---|---|---|---|---|
| 4,050,067 A | * | 9/1977 | Elmore, Jr. .................. 342/191 |
| 4,170,006 A | * | 10/1979 | Falk ............................. 342/25 |
| 4,660,044 A | * | 4/1987 | Lavelle ....................... 342/188 |
| 4,963,036 A | * | 10/1990 | Drisko et al. ................ 342/64 |
| 5,166,688 A | * | 11/1992 | Moreira ....................... 342/25 |
| 5,196,854 A | * | 3/1993 | Mathews ..................... 342/26 |
| 5,988,862 A | * | 11/1999 | Kacyra et al. .............. 702/155 |
| 6,044,336 A | * | 3/2000 | Marmarelis et al. ........ 342/159 |
| 6,232,913 B1 | * | 5/2001 | Lehtinen ..................... 342/192 |
| 6,246,468 B1 | * | 6/2001 | Dimsdale .................... 702/159 |
| 6,330,523 B1 | * | 12/2001 | Kacyra et al. .............. 702/159 |
| 6,420,698 B1 | * | 7/2002 | Dimsdale .................... 250/234 |
| 6,456,226 B1 | * | 9/2002 | Zheng et al. ................. 342/26 |
| 6,473,079 B1 | * | 10/2002 | Kacyra et al. .............. 345/419 |
| 6,512,518 B2 | * | 1/2003 | Dimsdale .................... 345/427 |
| 6,512,993 B2 | * | 1/2003 | Kacyra et al. .............. 702/159 |
| 6,583,751 B1 | * | 6/2003 | Ferretti et al. ................ 342/25 |

OTHER PUBLICATIONS

R.C. Wilson et al., "A Radar Reflectance Model for Terrain Analysis Using Shape From Shading"; Proceedings of the International Conference on Image Analysis for Processing (Sep. 27–29, 1999); pp. 868–873.*

* cited by examiner

Primary Examiner—Bernarr E. Gregory
(74) Attorney, Agent, or Firm—Honeywell Int'l Inc.

(57) ABSTRACT

A method, system, and computer program product for storing weather radar return data into a three-dimensional buffer. The system includes a radar system that transmits a radar signal and generates a radar measurement as a result of radar return of the transmitted radar signal. A three-dimensional buffer includes a plurality of storage locations. A processor is coupled to the radar system and the buffer. The processor generates or updates a reflectivity value in storage locations in the three-dimensional buffer based on the generated radar measurement, a previously stored reflectivity value for the storage location, and at least one of an uncertainty value for the storage location. The generated reflectivity value is stored in the three-dimensional buffer according to the storage location.

15 Claims, 2 Drawing Sheets

METHOD AND SYSTEM FOR GENERATING WEATHER AND GROUND REFLECTIVITY INFORMATION

CO-PENDING APPLICATION

This invention relates to copending U.S. patent application Ser. No. 10/080,197, applicant docket number H0002692, filed Feb. 19, 2002, which is hereby incorporated by reference.

BACKGROUND OF THE INVENTION

Attempts have been made to take radar signals received from the aircraft radar system, convert it to a reflectivity value, and store it in a location in a three-dimensional (3-D) weather buffer relative to the range associated with the radar signal. The 3-D weather buffer is an array of computer memory that includes data that describes a distribution of a parameter within a three-dimensional space (i.e., distribution of weather radar reflectivity). In the other attempts, a signal reflectivity value from a range bin is stored in a large number of three-dimensional buffer storage locations, because the radar signal spreads from its source.

A problem with earlier attempts is that ground clutter contamination of the desired weather signal occurs. Previous attempts have involved avoiding ground clutter contamination by pilot control of radar tilt. This method measures the ground scattering properties and uses this to separate ground from weather.

Therefore, there exists a need to more accurately identify weather information and to remove ground clutter contamination from a weather radar signal or identify ground in a weather radar signal.

SUMMARY OF THE INVENTION

The present invention is a method, system, and computer program product for storing weather radar return data into a three-dimensional buffer. The method involves modeling the radar signal scattering properties of space surrounding the radar/aircraft. Present radar measurements are compared to predictions of the measurement using the model. A difference between the present radar measurements and the predictions of the measurement is used to adjust the model.

Distribution of ground surface normalized radar cross section (NRCS) is estimated in a manner similar to weather reflectivity estimation. For the ground, the buffer represents the NRCS distribution in two dimensions to describe the ground surface, rather than the three dimensions to describe three-dimensional weather. Because one of the applications of an airborne radar is to provide a radar ground map, the present invention provides a ground map as an inherent part of the processing.

As will be readily appreciated from the foregoing summary, the invention provides more accurate information for storage in a three-dimensional buffer by performing estimations based on an antenna beam radiation pattern and a radar range weighting function.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
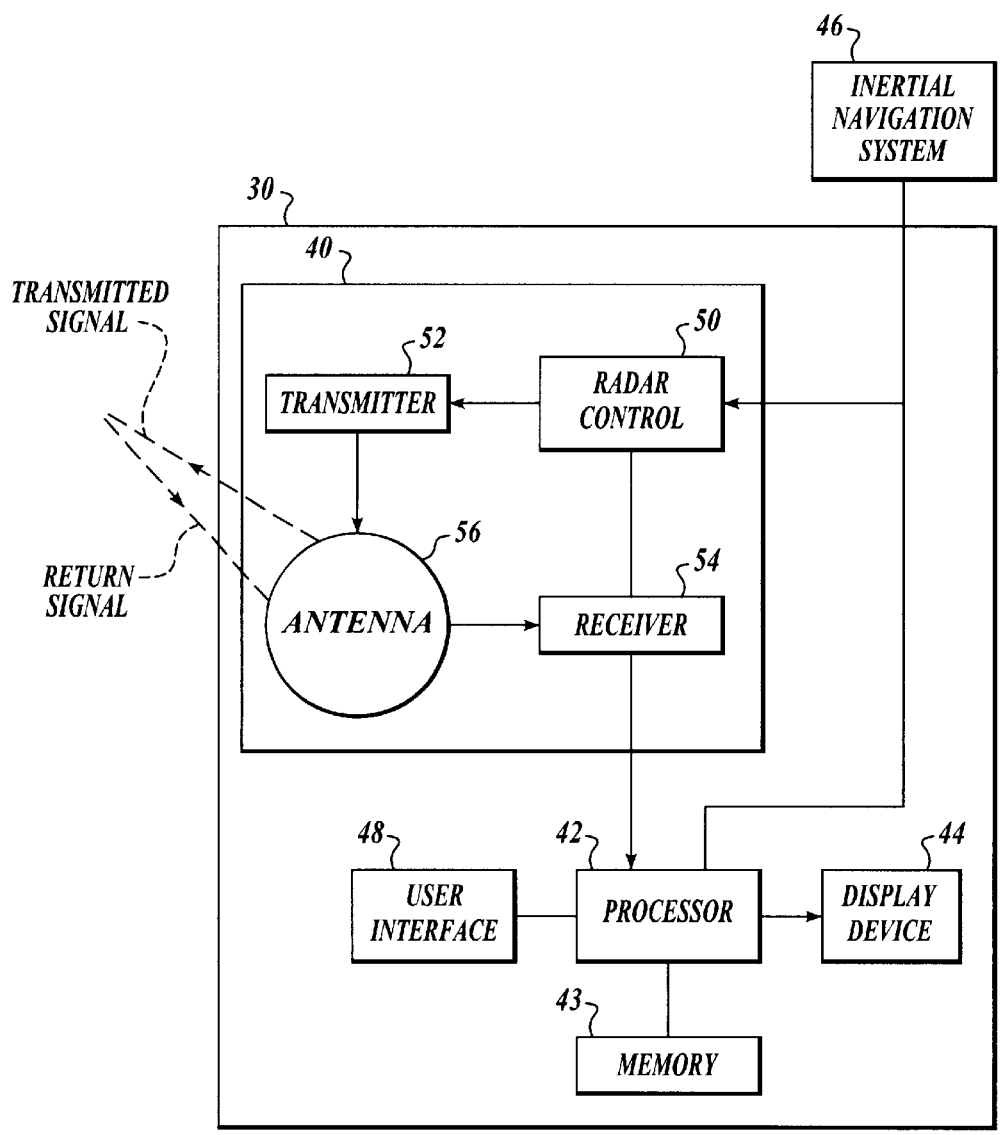
FIG. 1 is block diagram of a system that performs the present invention.

The present invention is a system, method, and computer program product for storing three-dimensional radar return data. FIG. 1 illustrates an example system 30 formed in accordance with the present invention. The system 30 includes a weather radar system 40, a processor 42, memory 43, a display device 44, an inertial navigation system (INS) 46, and a user interface 48 coupled to the processor 42. The display processor 42 is electrically coupled to the radar system 40, the display device 44, the INS 46, and the memory 43. An example radar system 40 includes a radar controller 50, a transmitter 52, a receiver 54, and an antenna 56. The radar controller 50 controls the transmitter 52 and the receiver 54 for performing the sending and receiving of signals through the antenna 56 based on aircraft data (i.e., position, heading, roll, yaw, pitch, etc.) received from the INS 46, or other aircraft systems.

The radar system 40 receives signals that arise from the scattering of transmitted pulses from the external environment including primarily of weather and terrain. The received signals are passed to the processor 42, which uses the received signals to update estimates of weather reflectivity and ground normalized radar cross section contained in computer memory (three-dimensional 3-D buffer). The processor 42 generates an image for presentation on the display device 44 based on any control signals sent from the user interface 48 or based on settings within the processor 42.

Figure 2:
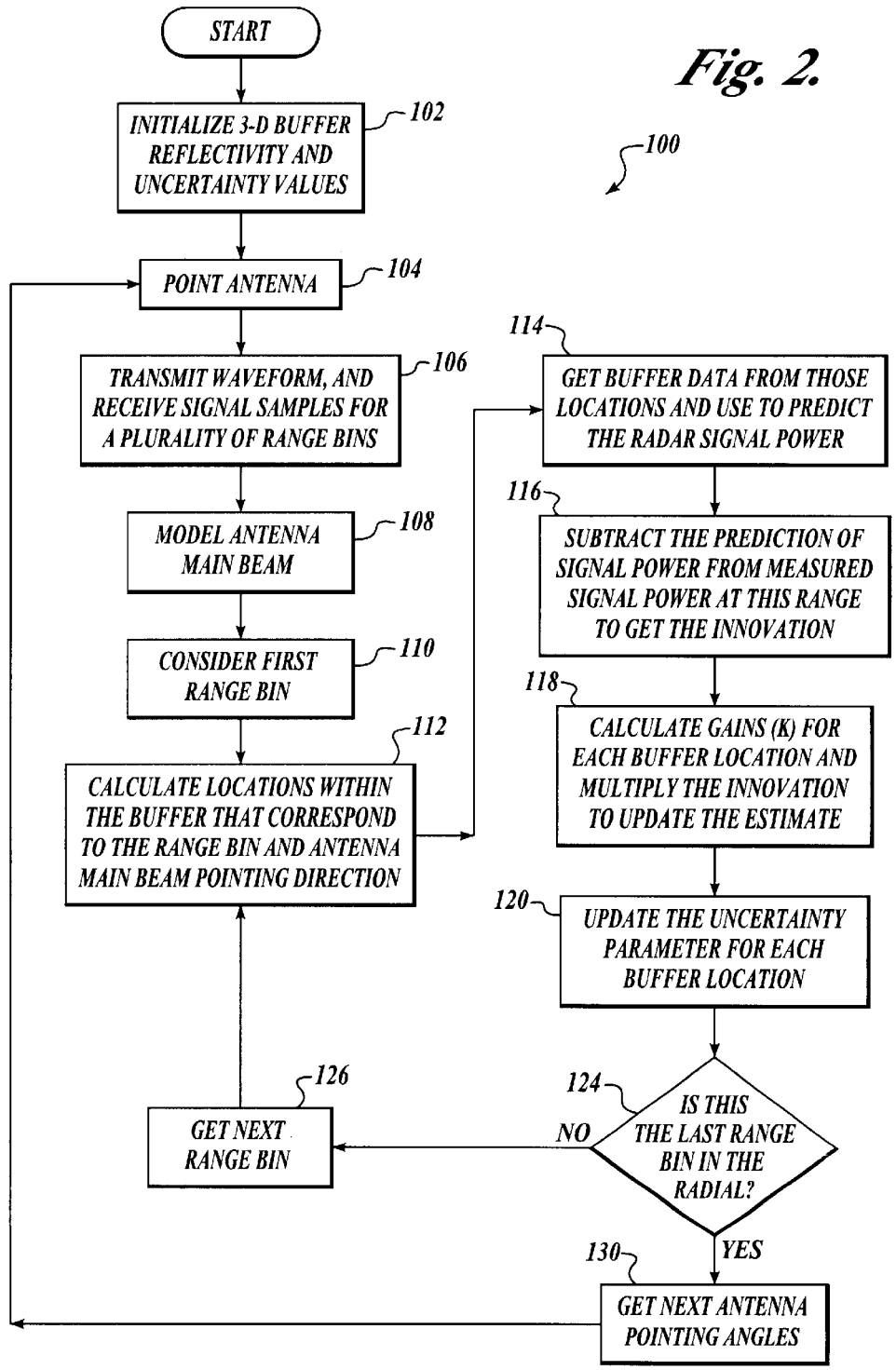
FIG. 2 illustrates a flow diagram performed by the system shown in FIG. 1.

FIG. 2 illustrates an example process 100 for storing reflectivity values in a three-dimensional display buffer. First, at a block 102, uncertainty values and reflectivity values associated with 3-D buffer locations are initialized to some beginning values. At a block 104, the main beam of the antenna is pointed in a particular radial direction. Next, at a block 106, the radar system transmits a waveform over the antenna, and receives signal samples for a plurality of range bins based on the transmitted waveform. At a block 108, the antenna main beam is modeled according to a 2-D array of vectors. Each vector represents an increment of solid angle within the antenna main beam. Each vector has an associated antenna gain value.

Then, at a block 110, the first range bin of the receive signal is considered. As part of the consideration of the first range bin, at a block 112, the processor 42 calculates locations within the 3-D buffer that correspond to the range bin and the pointing direction of the antenna main beam. Next, at a block 104, the processor 42 retrieves any data stored in the calculated locations of the 3-D buffer and uses the retrieved data to predict radar signal power. At a block 116, the processor 42 subtracts the signal power prediction from the measured signal power at the range bin, thereby generating an innovation value. At a block 118, the processor 42 calculates gains (k) for each calculated buffer location and multiplies the innovation by the calculated gain value for each location. Next, at block 120, the processor 42 updates the uncertainty parameter for each buffer location. At a decision block 124, if the present range bin is not the last range bin in the present radial, the process 100 continues on to the next range bin of the received signal. Once the next range bin value has been retrieved, the process continues on to the block 112 until the last range bin value has been reached. When the last range bin value has been reached, as determined at the decision block 124, the system gets the next antenna pointing angle, see block 130, and returns the process to block 104 where the antenna is pointed to the retrieved next antenna pointing angle.

The following further describes the process 100 by example. An example equation for determining the reflectivity value to store in a three-dimensional storage location is as follows:

$$\hat{Z}_i = \bar{Z}_i + K_i \left( S_{meas} - \sum_j h_j \bar{Z}_j \right) \quad (1)$$

First, a residual signal is determined by taking the difference between the measurement $S_{meas}$ and the prediction $$\sum_j h_j \bar{Z}_j$$

to get a residual signal, or innovation. $\bar{Z}_i$ is the reflectivity estimate for the $i^{th}$ grid point before the measurement, $\hat{Z}_i$ is the reflectivity estimate after the measurement, $K_i$ is a filter gain to convert radar signal values into reflectivity values, $S_{meas}$ is the measured radar signal. The h is an element weight that depends upon radar beam shape and a storage location's position relative to the radar beam shape. The determination of h is described in more detail below.

The filter gain $K_i$ is shown in Equation (8).

$$K_i = \frac{h_i P_i}{\sum_n h_n^2 P_n + \sigma_v^2} \quad (2)$$

Where $P_i$ is an uncertainty parameter of the $i^{th}$ reflectivity element, $\sigma_v 2$ is a variance of an assumed additive signal fluctuation noise, and the summation is of all the reflectivity elements to be updated using the current measurement.

In addition to updating the reflectivity element values, a measurement reduces the uncertainty in the estimates. Using the same model, the change in P is shown by example in Equation (9):

$$P_i' = P_i - \frac{h_i^2 P_i^2}{\sum_n h_n^2 P_n + \sigma_v^2} \quad (3)$$

where $P_i$ is the uncertainty parameter before the measurement, and $P_i'$ is the uncertainty parameter after the measurement.

Alternate equations for filter gain K and the parameter P are as follows:

$$K_i = \frac{k_k h_i P_i}{\sum_n h_n^2 P_n + \sigma_v^2} \text{ and} \quad (4)$$

$$P_i' = P_i - \frac{k_p h_i^2 P_i^2}{\sum_n h_n^2 P_n + \sigma_v^2} \quad (5)$$

One of ordinary skill determines the constant factors $k_k$ and $k_p$ empirically. The updating of the reflectivity values in three-dimensional storage locations using radar measurements involves the interplay between the corresponding weight (h) and the corresponding uncertainty parameters (P). The larger values of h correspond to locations near the axis of the antenna main beam. As can be seen from equation (10), if the uncertainty parameters are identical for storage locations, the storage location with the larger values of h tends to receive the greatest magnitude of update. Likewise, if the h's were identical for storage locations, the storage location with the highest relative uncertainty would receive the greatest update.

With the antenna beam scanning through an array of reflectivity elements (storage locations), elements near the beam axis would get relatively large updates and relatively large reductions in uncertainty. As the beam is scanned away from those elements, those elements still receive some degree of update. But elements on the other side of the beam that have similar h values receive greater updates because their initial estimates have more uncertainty. The uncertainty parameter provides a record of sorts of where the antenna beam has been within the reflectivity field buffer (three-dimensional buffer).

If the radar antenna is pointed in a particular direction to obtain measurements of the backscattered signal as a function of range, the mean value of this measurement is described by a radar equation. Considering only weather scatters, in one embodiment the radar equation is as follows:

$$P_{Rx} = K \int \frac{dr W_r(r)}{r^2} \int d\Omega G^2(\Omega) Z(r, \Omega) \quad (6)$$

where $P_{Rx}$ is a signal power, K is a constant that includes the effects of transmit power, losses, etc., $W_r(r)$ is a range weighting function appropriate for the time of the received signal power for normalizing the received signal, $G(\Omega)$ is antenna gain as a function of direction $\Omega$, and $Z(r,\Omega)$ is the reflectivity distribution.

In one embodiment, the received power is approximated by:

$$P_{Rx} \cong K \sum_n \frac{W_r(r_n) \delta r}{r_n^2} \sum_i G^2(\Omega_i) Z(r_n, \Omega_i) \delta \Omega \quad (7)$$

where $\delta r$ is an increment of range, $\delta \Omega$ is an increment of solid angle. The range weighting function and antenna gain function are evaluated at discrete points in the spatial coordinates $(r, \Omega)$. In order to simplify, the range weighting function $W_r$ is approximated as being roughly constant over a range solution interval of extent $\delta r$. Thus, the above approximation becomes:

$$P_{Rx} \cong \frac{K'}{r_n^2} \sum_i G^2(\Omega_i) Z(r_n, \Omega_i) \quad (8)$$

The summation over i approximates the integration over the antenna main beam in angle space (each term in the summation representing an incremental direction into space). Using the basis function expansion of the reflectivity field, the summation above is separated into groups of sums—each taken over a particular realization of a basis function. If the basis function is just a rectangular prism in a non-limiting example (which could be referred to as a voxel, where the reflectivity is assumed constant within the voxel), a unity weighting for each group of sums into a voxel is determined. Other basis functions can be used. In this case, the $h_k$'s is as follows:

$$h_k = \frac{K'}{r_n^2} \sum_i G^2(\Omega_i) \quad (9)$$

The summation is performed over only the incremental main beam directions that fall within a particular voxel.

Separation of ground scatter from weather scatter can be accomplished by estimating the distribution of ground normalized radar cross-section (NRCS) simultaneously with the weather reflectivity field estimation. Therefore, a ground radar map is generated as part of estimating the weather reflectivity field.

The process for the estimation of ground NRCS is similar to the process for weather reflectivity estimation. The received power from ground backscatter is approximated by:

$$P_{Rx} \cong \frac{K}{r^3} \sum_i G^2(\phi_i, \theta_{gnd}) \sigma^0(r, \phi_i) \tag{10}$$

$\sigma^0(r,\phi_i)$ is the NRCS of the ground at the range r and azimuth angle $\phi_i$. The antenna gain is evaluated in the direction of the ground at this range and azimuth angle. The terrain elevation is previously known. The constant K includes radar design parameters and increments used in the numerical integration. By expanding the NRCS distribution in terms of a set of basis functions, Equation 10 is put in the following form:

$$P_{Rx} \cong \sum_k h_k Z_k, \tag{11}$$

and the estimation of ground NRCS follows the same method as the estimation of weather reflectivity.

By estimating weather and ground scattered power, the two components are separable. The separation is done because the ground scatter with change in antenna pointing angle (particularly tilt) changes in a predictable way. An example scan strategy is to start at low tilt angles, and proceed toward high tilt angles. In this example, a good estimate of ground scatter is attained where it is not contaminated by weather scatter (lower tilt angles).

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A method comprising:
   receiving a radar measurement from the radar system as a result of a radar return from a transmitted radar beam;
   generating a prediction of a radar measurement based on current reflectivity distribution in space and how the radar receives the measurements;
   subtracting the generated prediction of the radar measurement from the received radar measurement;
   adjusting one or more reflectivity values based on the result of the subtraction; and
   storing the one or more adjusted reflectivity values, wherein the stored reflectivity values represent a portion of environment around the radar system.

2. The method of claim 1, wherein adjusting is further based on uncertainty of the reflectivity distribution.

3. The method of claim 1, wherein generating the prediction is further based on an antenna beam radiation pattern and a radar range weighting function.

4. The method of claim 1, wherein adjusting the reflectivity value includes updating a previously stored reflectivity value.

5. The method of claim 1, further comprising generating an estimate of ground normalized radar cross-section.

6. A system comprising:
   a radar system for transmitting a radar signal and generating a radar measurement as a result of radar return of the transmitted radar signal;
   memory; and
   a processor coupled to the radar system and memory, the processor comprising:
   a first component for generating a prediction of a radar measurement based on current reflectivity distribution in space and how the radar receives the measurements;
   a second component for subtracting the generated prediction of the radar measurement from the received radar measurement;
   a third component for adjusting one or more reflectivity values based on the result of the subtraction; and
   a fourth component for storing the one or more adjusted reflectivity values, wherein the stored reflectivity values represent a portion of environment around the radar system.

7. The system of claim 6, wherein the third component adjusts further based on uncertainty of the reflectivity distribution.

8. The system of claim 6, wherein the third component generates based on an antenna beam radiation pattern and a radar range weighting function.

9. The system of claim 6, wherein the third component updates a previously stored reflectivity value.

10. The system of claim 6, wherein the processor further comprises a fifth component for generating an estimate of ground normalized radar cross-section.

11. A computer program product residing on a computer readable medium comprising:
    a first component for receiving a radar measurement from a radar system as a result of a radar return from a transmitted radar beam;
    a second component for generating a prediction of a radar measurement based on current reflectivity distribution in space and how the radar receives the measurements;
    a third component for subtracting the generated prediction of the radar measurement from the received radar measurement;
    a fourth component for adjusting one or more reflectivity values based on the result of the subtraction; and
    a fifth component for storing the one or more adjusted reflectivity values, wherein the stored reflectivity values represent a portion of environment around the radar system.

12. The product of claim 11, wherein the fourth component adjusts further based on uncertainty of the reflectivity distribution.

13. The product of claim 11, wherein the second component generates based on an antenna beam radiation pattern and a radar range weighting function.

14. The product of claim 11, wherein the fourth component updates a previously stored reflectivity value.

15. The product of claim 11, further comprising a sixth component for generating an estimate of ground normalized radar cross-section.

* * * * *